July 19, 1938.   A. D. MUNSTERMAN   2,124,309
ONION HARVESTER
Filed July 10, 1936   4 Sheets-Sheet 1
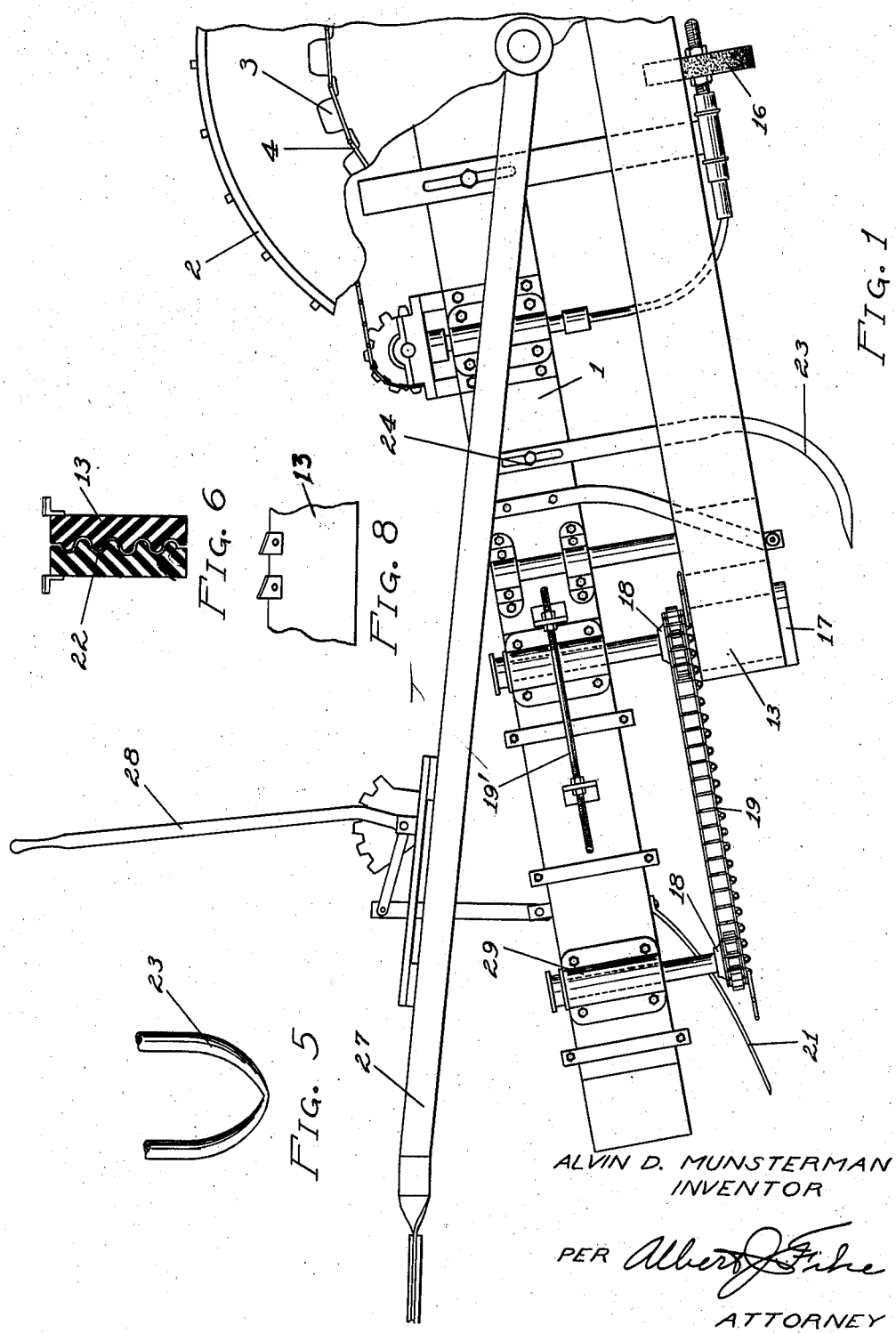
ALVIN D. MUNSTERMAN
INVENTOR
PER *Albert J. Fihe*
ATTORNEY

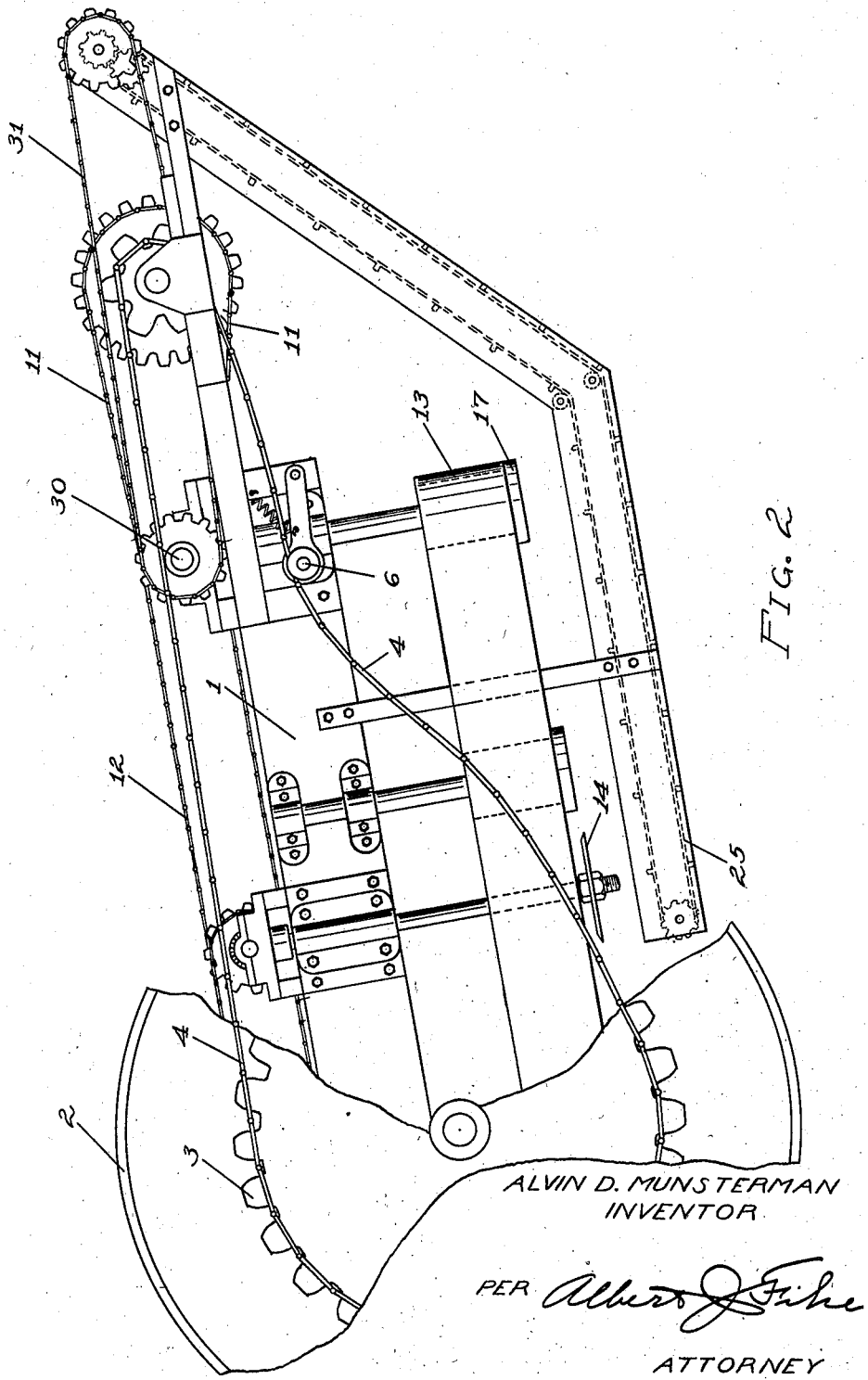

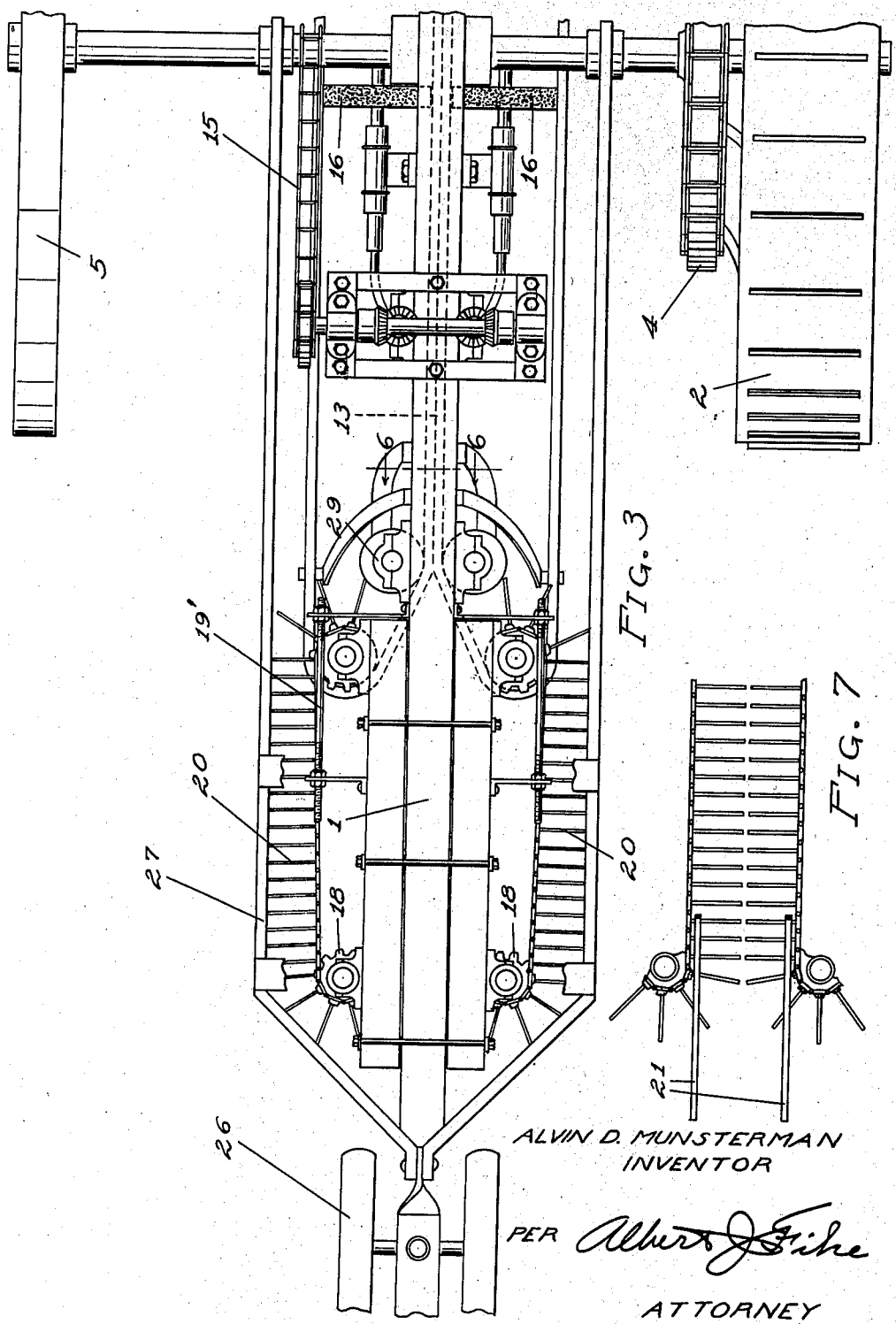

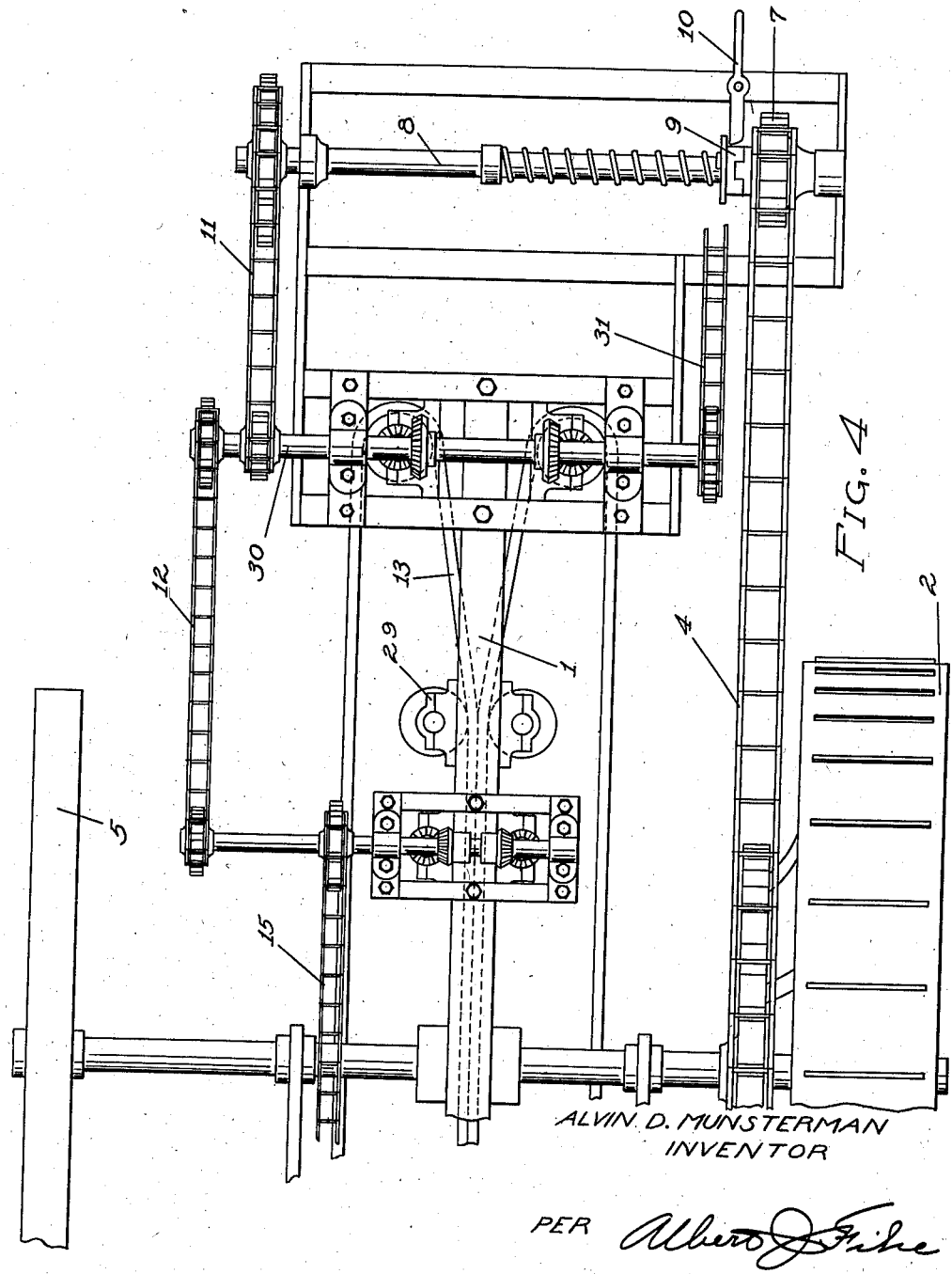

Patented July 19, 1938

2,124,309

UNITED STATES PATENT OFFICE 2,124,309

ONION HARVESTER

Alvin D. Munsterman, Bensenville, Ill.

Application July 10, 1936, Serial No. 89,952

13 Claims. (Cl. 55—108)

This invention relates to an improved onion harvester, and while the particular machine of this invention is designed especially for harvesting this particular vegetable, the apparatus may with either very little or no change be used for harvesting other products.

An important object of this invention is to provide, in a single mechanism, means which will preliminarily raise the onion stalk from the ground if they have been trampled or beaten down, then, further, cause them to assume a practically upright position, after which the stalks are clamped, while, at the same time, the onions are dug from the ground or severed from their roots, after which the loosened vegetables are raised bodily from the ground; excess earth brushed off; the tops cut away; and the onions themselves dropped onto a conveyer, after which they are delivered to bags, all in one continuous operation.

Another object of the invention is to provide, in a crop harvesting machine, a novel means for raising the harvested products bodily from the ground, while the machine is progressing thereover, while, at the same time, the raising action takes place in a directly vertical line without any shifting or lateral motion, which might result in undesirable tearing or pulling apart of the vegetables. This is accomplished by means of a pair of traveling belts which grip the vegetable stalks or stems, and which travel rearwardly at the same rate as the machine travels forwardly, while, at the same time, progressing gradually upwardly.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the front portion of the improved onion harvesting machine of this invention.

Figure 2 is a side elevation of the rear end of the machine, certain overlapping parts being duplicated for the purpose of better illustration.

Figure 3 is a top plan view of the forward end of the device.

Figure 4 is a top plan view of the rear end of the apparatus.

Figure 5 is a detail front view of the cutting knife.

Figure 6 is a sectional view of a modified form of the lifting belt of this invention, and Figure 7 is a plan view of a portion of the apparatus which is not visible in Figure 3.

Figure 8 is a side view of the belt of Figure 6.

As shown in the drawings:

The reference numeral 1 indicates generally the supporting frame of the improved onion harvester of this invention, the same having a supporting and driving wheel 2 upon which is a gear 3 designed to operate a driving chain 4.

A complementary supporting wheel 5 is provided as best shown in Figures 3 and 4. The supporting and driving wheel 2 is of a greater diameter and has a broader tractive force than the wheel 5 inasmuch as the actual driving of the entire mechanism is accomplished by means of the rotation of the wheel 2.

A tightener for the chain 4 is provided at 6 as shown, and this chain rides over the sprocket 7 which is mounted on a shaft 8 upon which is positioned a clutch element 9 operated by means of a lever 10. The engagement of this clutch throws the chains 11 and 12 into action, which chains, through respective shafts and gears, operate the lifting belt 13 and a set of cutter knives 14.

A further chain 15 runs forward as best shown in Figures 3 and 4, and, through respective gears and flexible shafts, operates a set of cleaning brushes 16.

The gathering belt 13 is mounted on suitable supporting pulleys 17 as best illustrated in Figures 1 and 2, and the forward pulleys, in turn, also operate a set of gears 18, upon each of which is mounted a chain 19, each chain having a set of projections 20 thereon which, as best shown in Figure 7, rotate opposite each other but not quite in contact. This action takes place beneath the forward end of the frame 1 of the machine. The position and relationship of these elements can be adjusted by means of screw-threaded rods 19' as shown.

At the extreme forward end of the frame 1 is mounted a curved prong or the like 21 projecting forwardly as best shown in Figures 1 and 7, and which is for the purpose of lifting up stalks or tops of onions or any other vegetable which can be harvested by this machine. As the machine progresses, the lifted stalks come into contact with the projecting fingers 20 as best shown in Figure 7 and are thereby constrained to assume an upright or practically vertical position. Further progress of the machine grips these lifted stalks between the two opposed faces of the belt 13 which are preferably corrugated as shown at 22 of Figure 6 so as to afford a better gripping action.

The speed of the belt 13 is synchronized with that of the machine by so regulating the relationship of the driving chains 4 and 11 and the attendant shafts and gears so that the inner contacting portions of the belt will always move rearwardly at exactly the same speed as the forward motion of the machine itself. In this way, there is no progressive motion either forwardly or rearwardly so far as the action of the inner opposed faces of the belt 13 is concerned. However, as will be evident from an inspection of Figures 1 and 2, the belt is tilted at an angle with regard to the ground, and the fact that the stalks or tops of the vegetable are held to a face of the belt will result in a gradual lifting of the vegetables from their position in the ground. This is made possible and is also facilitated by the action of a cutting knife 23 which is shown in side elevation in Figure 1 and in front elevation in Figure 5, this being all in one piece, but formed in a U-shape as best shown in Figure 5, the lower edge being sharpened to provide a preferable cutting action. The relationship of this knife with respect to the frame 1 can be adjusted by means of a bolt 24 acting in a suitable slot.

The vegetables having been loosened and raised from the ground are then passed between the brushes 16 which are rotating at a desired or suitable speed, and it may be mentioned in passing that these brushes may be of desired number, size or stiffness so as to produce a desired cleaning or brushing action so far as the particular vegetable to be harvested is concerned. After the dirt has been removed by these brushes, the vegetables still held by the belt 13 pass above a conveyer 25 which is mounted at the rear end of the machine as best shown in Figure 2, and at that point, the knives 14 act to sever the bulbous or desired part of the vegetable from the stems or stalks, allowing the same to drop into the conveyer 25, whence they are carried to the rear and top end of the machine and delivered to bags or the like, which may be hung upon suitable brackets or hooks at that point.

If the vegetables are desired for market with the tops thereon, the knives, of course, can be readily removed, and the products delivered onto the conveyer can then be grasped in bunches for suitable and corresponding packaging.

The entire apparatus is adapted to be propelled over the ground by means of a tractor or the like, the rear wheels of which are connected at 26 in Figure 3, and a suitable connection to the tractor is made by means of draw bars or the like 27, the draw bars having mounted thereon a suitable lever 28 which can be shifted to raise or lower the main portion of the body 1 with respect to the ground, this being for the purpose of accommodating the apparatus to the harvesting of vegetables of different types and also to meet various conditions of growth which will vary from field to field and from season to season.

All of the shafts which drive the various gears pulleys, brushes and the like are encased in dust-proof bearings as illustrated at 29, and which may be roller or ball bearing as desired or suitable. Some of the casings are shown open in the drawings for better illustrative purposes.

The conveyer is driven from the main mechanism through the chain 11 and the shaft 30 by means of an auxiliary chain 31 as best shown in Figures 2 and 4.

The apparatus can be made in duplicate, triplicate, etc. so that two or more rows of onions or the like may be harvested at one time, and in this event, adjustment of the distance between the belts, brushes, etc., is provided for.

It will be evident that herein is provided an onion harvesting machine or the like which is particularly adapted for gathering these vegetables and which will eliminate the arduous and tiresome manual labor which has heretofore been considered absolutely indispensable in connection with the gathering of these and similar products. Furthermore, the device will perform all the necessary operations in a much more speedy manner, thereby enabling the harvesting to be done at psychological times, making the farmer more independent of the weather than he has heretofore been. It is well-known that many of these crops must be harvested at a particular time of their growth, and under certain weather conditions in order to insure against loss in spoilage, and it often happens that sufficient manual labor is inevitable at the required times whereby considerable loss has been heretofore unavoidable.

The combination of a device, which will lift the stalks, grasp the same, cut the bulbs away from the roots and from the surrounding earth, raise the stalk and bulb, scrape the bulb and finally deliver the same either attached to or cut away from the stalk onto a conveyer for packing, is believed to be wholly new in the art and produces a considerable advantage over any apparatus previously developed along this line.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In a vegetable harvester, a frame movable over the ground, a belt traveling in the frame for grasping vegetable stalks, and means for moving the belt rearwardly of the frame at the same speed that the machine moves forwardly, while, at the same time, raising said relatively stationary part of the belt vertically, said means including supporting wheels for the frame, one of said wheels being of a greater diameter and having a broader tractive surface than the other, and a system of gears and chains connecting the larger wheel to the belts for synchronously driving the same.

2. A vegetable harvester, including a frame movable over the ground, means on the frame for preliminarily raising the vegetable stalks, additional means for grasping and lifting the same, and means for cutting the vegetable loose from the ground, together with means for operating the grasping and lifting means, said means including supporting wheels for the frame, one of said wheels being of a greater diameter and having a broader tractive surface than the other, and a series of gears and chains connecting the larger wheel to the grasping and lifting means together with an offset axle for the smaller wheel.

3. An onion harvester, comprising a frame, supporting wheels therefor, onion stalk straightening means movable in the frame, a pair of belts comprising stalk gripping means also movable in the frame and synchronized with the forward motion thereof, a pair of onion cleaning brushes rotatably mounted in the frame, a set of cutting knives also rotatably mounted in the frame, and means operated by the supporting wheels for driving the stalk lifting means, pulling belts, the brushes and the knives.

4. An onion harvester, comprising a frame, supporting wheels therefor, onion stalk straightening means movable in the frame, a pair of belts comprising stalk gripping means also movable in the frame and synchronized with the forward motion thereof, a pair of onion cleaning brushes rotatably mounted in the frame, a set of cutting knives also rotatably mounted in the frame, and means operated by the supporting wheels for driving the stalk lifting means, the pulling belts, the brushes and the knives, together with an assembling and delivering conveyer mounted on the frame.

5. An onion harvester, comprising a frame, supporting wheels therefor, onion stalk straightening means movable in the frame, a pair of belts comprising stalk gripping means also movable in the frame and synchronized with the forward motion thereof, a pair of onion cleaning brushes rotatably mounted in the frame, a set of cutting knives also rotatably mounted in the frame, and means operated by the supporting wheels for driving the stalk lifting means, the pulling belts, the brushes and the knives, together with an assembling and delivering conveyer mounted on the frame, and further means connected to the supporting wheels for operating the conveyer.

6. In an onion harvester, means for preliminarily raising and straightening the stalks, said means comprising a pair of chains mounted in opposed relationship, a projection extending laterally from each link of each chain, and means for mounting the chains for cooperative relation.

7. In an onion harvester, means for preliminarily raising and straightening the stalks, said means comprising a pair of chains mounted in opposed relationship, a projection extending laterally from each link of each chain, and means for mounting the chains for cooperative relation, but without any actual contact between the chains or projections.

8. In an onion harvesting machine, a pair of opposed belts, means for rotatably supporting the belts for contactual relationship throughout a portion of their respective lengths, and means for rotating the belts at a speed synchronized with that of the machine.

9. In an onion harvesting machine, a pair of opposed belts, means for rotatably supporting the belts for contactual relationship throughout a portion of their respective lengths, and means for rotating the belts at a speed synchronized with that of the machine, whereby, when the machine is in motion, there will be no relative motion between the contacting parts of the belts and the ground over which the machine is passing.

10. In an onion harvesting machine, a pair of opposed belts, means for rotatably supporting the belts for contactual relationship throughout a portion of their respective lengths, and means for rotating the belts at a speed synchronized with that of the machine, whereby, when the machine is in motion, there will be no relative motion between the contacting parts of the belts and the ground over which the machine is passing, while, at the same time, any area of contact between the two belts is gradually raised vertically from the ground.

11. In an onion harvesting machine, a pair of opposed belts, means for rotatably supporting the belts for contactual relationship throughout a portion of their respective lengths, and means for rotating the belts at a speed synchronized with that of the machine, whereby, when the machine is in motion, there will be no relative motion between the contacting parts of the belts and the ground over which the machine is passing, while, at the same time, any area of contact between the two belts is gradually raised vertically from the ground, and corrugations on opposed faces of the belts for intermeshing linear relationship.

12. In an onion harvesting machine, a pair of opposed belts, means for rotatably supporting the belts for contactual relationship throughout a portion of their respective lengths, and means for rotating the belts at a speed synchronized with that of the machine, whereby, when the machine is in motion, there will be no relative motion between the contacting parts of the belts and the ground over which the machine is passing, while, at the same time, any area of contact between the two belts is gradually raised vertically from the ground, the frame for supporting the belts being positioned at an angle to the ground for effecting said vertical movement.

13. In an onion harvesting machine, a pair of opposed belts, means for rotatably supporting the belts for contactual relationship throughout a portion of their respective lengths, and means for rotating the belts at a speed synchronized with that of the machine, whereby, when the machine is in motion, there will be no relative motion between the contacting parts of the belts and the ground over which the machine is passing, while, at the same time, any area of contact between the two belts is gradually raised vertically from the ground, the frame for supporting the belts being positioned at an angle to the ground for effecting said vertical movement, together with means for adjustably altering the angular relationship of the frame with the ground.

ALVIN D. MUNSTERMAN.